United States Patent [19]

Richmond

[11] Patent Number: 5,784,529
[45] Date of Patent: Jul. 21, 1998

[54] METHOD AND APPARATUS FOR CORRECTING NOISE IN A FILM SCANNER

[75] Inventor: Benjamin Franklin Richmond, Baldock, United Kingdom

[73] Assignee: Rank Cintel Limited, United Kingdom

[21] Appl. No.: 474,704

[22] Filed: Jun. 7, 1995

[30] Foreign Application Priority Data

Oct. 18, 1994 [GB] United Kingdom ............ 9420932

[51] Int. Cl.$^6$ ........................ H04N 5/91; H04N 3/36
[52] U.S. Cl. ............................ 386/128; 348/97
[58] Field of Search ............. 348/97, 96, 98, 348/112; 358/335, 336, 314; 386/127, 128; H04N 5/91, 3/36

[56] References Cited

U.S. PATENT DOCUMENTS

| 4,903,131 | 2/1990 | Lingemann et al. ........... 348/97 |
| 5,012,346 | 4/1991 | DeJager et al. |
| 5,155,596 | 10/1992 | Kurtz et al. |
| 5,185,668 | 2/1993 | Ohta ........... 348/97 |
| 5,467,412 | 11/1995 | Capitant et al. ........... 348/97 |

*Primary Examiner*—Robert Chevalier
*Attorney, Agent, or Firm*—Ostrolenk, Faber, Gerb & Soffen, LLP

[57] ABSTRACT

In a film scanner, noise caused by fluctuations in the intensity of a light source 100 are corrected by taking a sample 175 of the light source and correcting the image read from, or written to, the film with respect to the sample. Preferably, the sample is routed around a film gate 105 and has a similar optical path as the image sample 125. In this way, noise due to variations in the optical path and additional electronics 185 may also be corrected.

31 Claims, 5 Drawing Sheets

METHOD AND APPARATUS FOR CORRECTING NOISE IN A FILM SCANNER

FIELD OF THE INVENTION

This invention relates to method and apparatus for reducing the effect of noise introduced by unwanted variations, such as light source fluctuations, in a situation where a film image is scanned over a period of time.

BACKGROUND OF THE INVENTION

In a film scanner in which film is scanned over a period of time, fluctuations in the intensity of the light source over that period of time cause an unwanted disturbance in the signal read from, the film. In a film scanner reading a signal from a film frame, the noise introduced by this disturbance is an unwanted modulation of the electrical signal output from a detector, caused by fluctuations in the light source intensity.

To provide a lamp having intensity fluctuations which do not cause this unwanted disturbance would mean the luminous output of the light source must be controlled to a very high tolerance.

A good engineering rule would be to arrange the stability of the light source to be at least one order of magnitude (twice as) better than the dynamic resolution of the CCD sensor. This arrangement would mean that the fluctuations in intensity of the light source would not contribute a significant reduction in image quality compared with a theoretically perfect source. This typically would mean a light source of the stated stability up to the frequency of the sensing. To achieve this order of stability would be prohibitively expensive.

Various complex optical systems have been proposed to produce an acceptable quality of illumination. The type of solution depends to a degree on the physics of the light source itself with the obvious differences between an alternating current (ac) incandescent lamp compared to a direct current (dc) driven incandescent lamp. There are characteristic light output quality differences between say gas discharge lamps such as Xenon arc lamps and thermal devices such as quartz halogen lamps.

Every light source produces optical noise and the correction applied will need to be applicable to the specific nature of the noise. For example a Xenon light source has a higher frequency noise characteristic than a quartz halogen light source.

SUMMARY OF THE INVENTION

It is an object of the invention to eliminate the results of unwanted noise such as that caused by intensity fluctuations due to the light source and other components of a film scanner.

This and other objects are achieved by a noise corrector for film scanner, the film scanner comprising, a light source for illuminating film and a first detector for detecting a first sample of light from the light source modulated by the film to produce a first signal, the noise corrector comprising a second detector for detecting a second sample of light from the light source unmodulated by the film to produce a second signal, and means for compensating the first signal with reference to the second signal to produce an output signal.

Apparatus embodying the invention has the advantage that unwanted noise is corrected—producing a more accurate film scan. The noise corrected could be optical noise and, in particular, the output signal of the scanner is compensated for fluctuations in intensity caused by the light source. A scanner embodying the invention may be a line array scanner, in which fluctuations are corrected from line to line, or an area array scanner, in which fluctuations are corrected from field to field.

In an embodiment of the invention, the first and second detectors are separate portions of a single sensor.

This has the advantage that any variation in the characteristics of the first and second detectors is effectively cancelled, as the characteristics of the two sensors are identical.

In a further embodiment of the invention, the samples of light provided to the first and second detectors pass along similar optical paths except that the light applied to the first detector passes through the film, whilst the light applied to the second detector does not.

In this embodiment, fluctuations due to components other than the light source such as temporal changes in the optical path caused by heat and variations in the aperture size due to expansion and contraction, are also cancelled as the light imaged onto the first and second detectors passes along similar optical paths. Any imperfections introduced into the first and second signals will be almost identical, and will be cancelled in the means for compensating the first signal with reference to the second.

The invention also provides a method for correcting for fluctuations in intensity of a light source in a film scanner, comprising illuminating film with light from a light source, detecting light from the light source modulated by the film to produce a first signal, detecting light from the light source unmodulated by the film to produce a second signal, and compensating the first signal with respect to the second signal to produce an output signal.

The invention is particularly relevant to high resolution film scanners where an image is scanned across a line array CCD (Charge Coupled Device). The image on the film is built up in the scanner by sampling thousands of adjacent lines over a number of seconds. In such scanners, the quality of the output signal is of premium importance, and so correction of errors introduced by light source fluctuations is desirable.

BRIEF DESCRIPTION OF THE DRAWINGS

Embodiments of the invention will now be described, by way of example only, with reference to the accompanying drawings, in which.

DETAILED DESCRIPTION

Figures 1, 2:
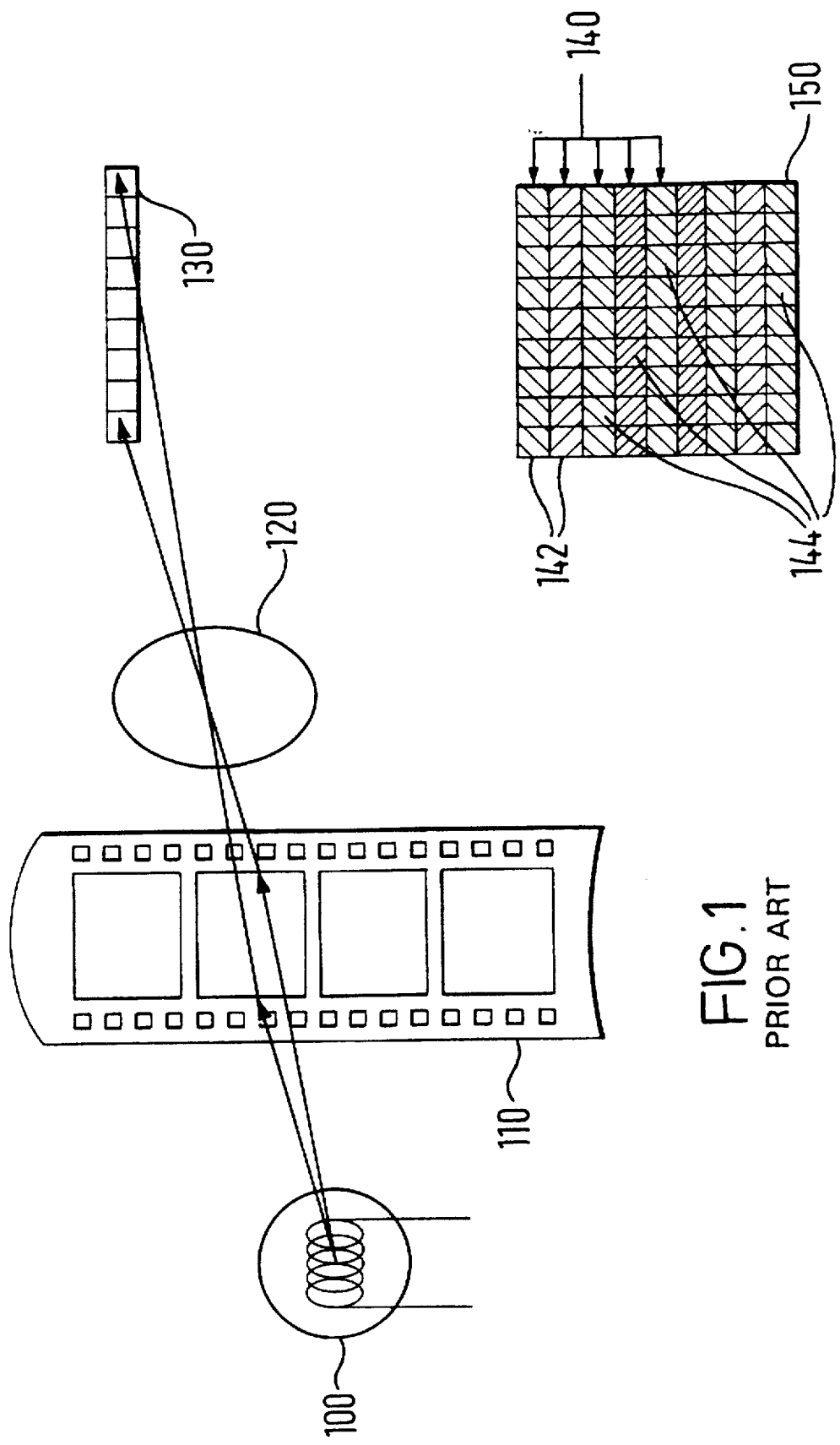
FIG. 1 is a diagrammatic perspective view of a prior art CCD line scanner.
FIG. 2 is a diagrammatic view showing how variations in light source intensity cause unwanted fluctuations in rows of a pixel image.

In a typical film line scanner, as shown in FIG. 1, a lamp 100 such as 300 w xenon Arc LAMP ILC R400 illuminates a portion of a film 110 which may be held in a gate mechanism. A strip of the film is imaged onto a scanning sensor 130 such as a Dalsa Inc. IT-C5-4096 by a lens 120 such as a (Nikon Nikkor 105 mm 72.8 printing lens JWA-003 AB).

A two dimensional scan of a film frame is constructed by sampling a series of adjacent lines of the film 110. The scanning sensor, here a line array CCD, is a device with a number of photosensitive elements arranged as a single row. When scanning is initiated all the elements in the row capture a sample of the image simultaneously. This row only represents a small portion of the image. In order to capture the whole frame, the film is moved slightly by a precise amount with respect to the sensor, and another scan is executed. In this way the whole film frame is scanned and the captured image built up.

The film information sensed by the CCD is represented by an analogue electrical signal corresponding to the light intensity which was present on each of the individual photosites at the time the row of elements was sampled (i.e. clocked out). The processing of this electrical film signal is not discussed as it is well known to those skilled in the art. The light source 100 may be of any suitable colour. For a full colour scan, three separate scans with each of red, green and blue light may be performed. These multiple scan signals are then processed to allow eventual reconstruction of a faithful representation of the film image on a display medium.

The method of film scanning described above yields the following important result—all the information in one line of the image is captured at the same time. Hence all the samples within a line are subjected to the same relative intensity irrespective of the absolute light source brightness. Each photosite is modulated by the film density. However, if individual lines are captured with a time difference they are subject to variations in absolute brightness of the light source as well as the density variations of the film image.

In transferring a film frame to be an electrical signal as described above an entire frame is constructed of tens, hundreds or thousands of adjacent lines dependent upon the resolution of the scanner involved. With relatively low quality scanning (i.e. low dynamic range and resolution), or where the capture rate of the sensor and the frequency of the optical noise are relatively different enough to render them out of band with one another for the frequencies of interest, the variation of the absolute brightness of the light source may be insignificant. However, with resolutions such as required for High Definition Television, the print industry, and digital film special effects processing, the time necessary to scan a whole film frame may involve timescales where any variation of the absolute brightness of the light source may be significant and induce errors on the CCD electrical output signal.

In these circumstances the optical noise of the lamp source is taken into consideration in apparatus according to the invention, and the CCD electrical signal corrected for any line by line variation of the brightness of the light source. Any such line by line light source brightness variation may manifest itself as 'ripples' on the processed image.

The 'ripples' on the processed image caused by fluctuations in the intensity of the lamp 100 are shown in FIG. 2. An electrical pixel map of an image 150 comprises individual pixels 144. All the pixels in a particular line 140 are captured at the same instant. Adjacent lines 142 are of the same intensity on the film frame, however, there is a variation in the intensity of these lines when represented by the electronic pixel map derived from a film scanner. This variation is due to fluctuations in the intensity of the lamp 100. This sort of imperfection is unacceptable for many applications. In order to preserve the quality of the image, each line must be captured with the sampling conditions defined within a specified tolerance.

Lower frequency fluctuations in the light source intensity could appear as variations in intensity from field to field, or frame to frame which could be caused by mains frequency interference. The result of these fluctuation would appear as flicker on the final image produced from the output signal of the film scanner. Such low frequency fluctuations are also corrected by apparatus according to the invention.

Figure 3:
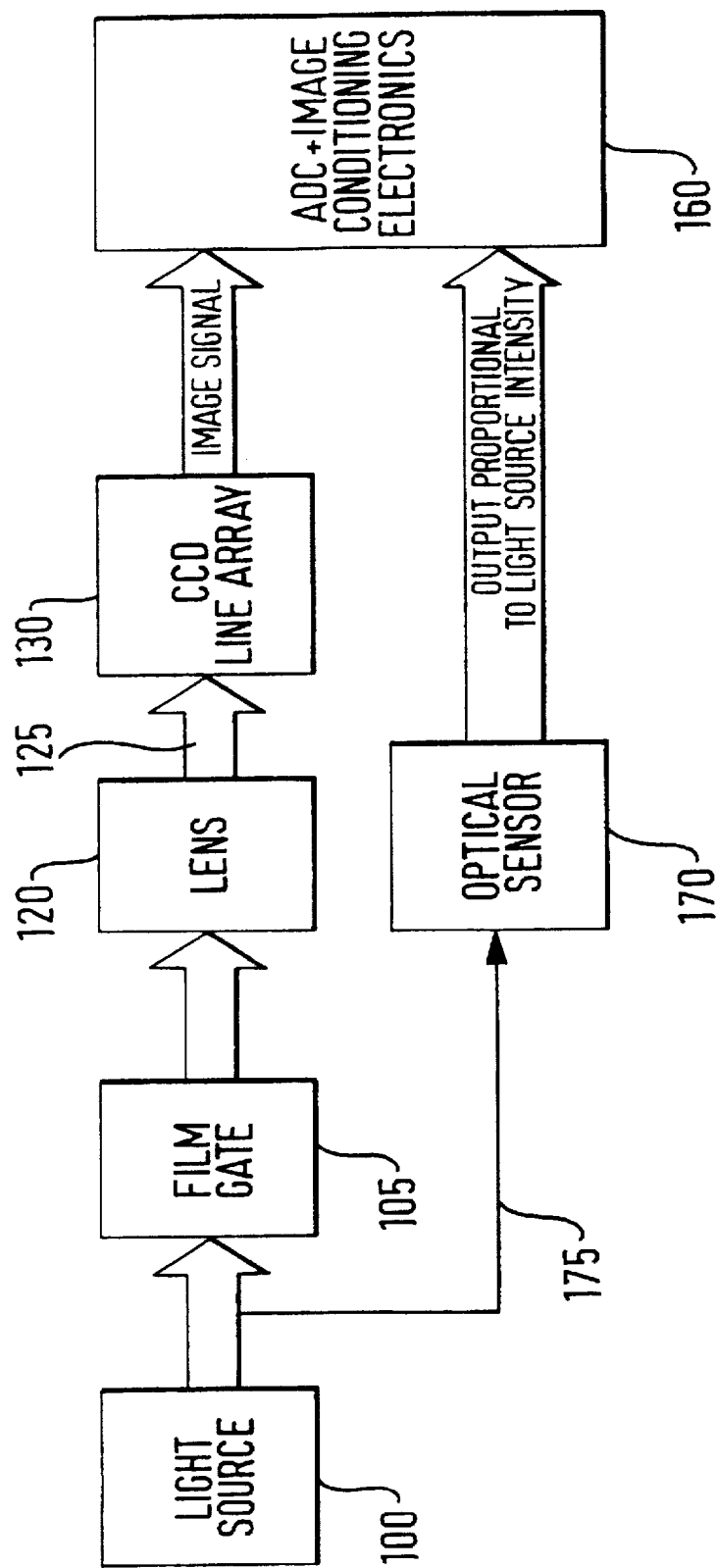
FIG. 3 is a diagram showing the basic operations of a first embodiment of the invention.

A first embodiment showing the basic principles of the operation of a film scanner embodying the invention are shown in FIG. 3. The film scanner comprises a light source 100, an imaging lens 120 and a scanning sensor 130 as in FIG. 1. A film gate 105 such as a Bell & Howell clapper gate manufactured by Neilson-Hordell is provided for supporting and advancing the film. The scanning sensor is, preferably, a line array CCD as in FIG. 1. Other sensors such as Photo Diodes and Avalanche Photo Diodes (APD's) are also suitable. Additionally, an optical sensor 170 such as a Burr Brown OPT 301M takes a "reference" sample 175 of the light source just before it enters the film at the same instant in time as the film image is sampled by the CCD. By taking the reference and image samples at the same instant, any changes in intensity, due to the light source or other components, affects both samples equally so that the change may be accounted for and cancelled. The scanner also has additional electronics 160 which takes an output from both the line array CCD 130 and the optical sensor 170. These electronics 160 compensate the signal from the line array CCD with reference to the signal from the optical sensor 170, to produce an output signal 180. This output signal will represent the light imaged onto the line array 130 which has been modulated by the film 110, but does not include any modulation of light due to intensity fluctuations of the light source 100.

Compensating the light source in this way removes the effect of light source fluctuations, and therefore circumvents the necessity to develop an ultra-stable light source. An optimum configuration involves diverting a sample of light just before it enters the film, so that the sensor which samples the image also samples the reference. This sample bypasses the film, and is reinserted into the optical path just after the film.

Figure 4:
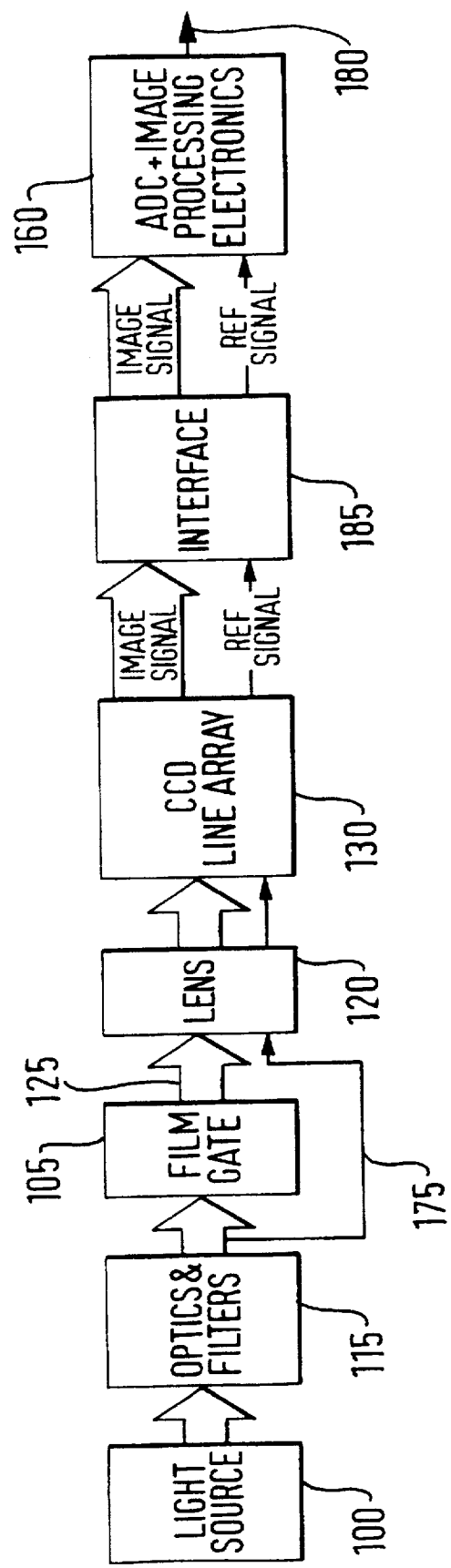
FIG. 4 is a diagram showing the basic operations of a second, preferred embodiment of the invention.

FIG. 4 shows a second, preferred embodiment of the invention which uses this optimum configuration. The film scanner comprises a light source 100, an imaging lens 120, a film gate 105 and a scanning sensor 130 as before. Additional optics and filters 115 such as a Balzers Filtraflex-K, Red BBK 652, Blue BBK 452, Green BBK 552 are shown in this embodiment. These may comprise coloured and neutral density filters for providing three-colour scans. The scanner also comprises an interface 185 for connection between the line array CCD 130 and the processing electronics 160. The interface 185 and processing electronics 160 are bespoke designs. However, the man skilled in the art would realise that commercially available circuitry could be used. The processing electronics 160 includes custom modules manufactured by Edge Technology Inc.

In this embodiment, a sample of the light 175 prior to the film gate 105 is routed around the gate and imaged through the lens 120 onto the CCD 130. The function of the sensor 170 is thus provided by a portion of CCD sensor 130. The reference sample 175 and image sample 125 pass along similar optical paths; except that the image sample passes through, and is modulated by the film, whilst the reference sample 175 does not. This arrangement has the benefit that the sample 175 acts as a reference to the light source level as well as to other components. This is because the reference sample 175 will be modulated in sympathy with the image by variations in optical and electronic components. For example light level variations could be caused by thermal effects on the lens aperture of lens 120. The CCD sensors' sensitivity along with low frequency noise components in the interface electronics before the electronic processing will be compensated in the same way. Thus the sample can also be used to compensate for electrical noise caused by noisy components in the electronics path.

The optical path is arranged such that the reference sample is imaged onto the line array CCD sensor 130 to be on otherwise unused photosites adjacent to those used for the film image. When the CCD is instructed to take a sample it will capture the film image sample 125 (the light source modulated by the film image) plus the reference 175 (the light source unmodulated by the film image). Now, the down stream electronics 160 can use the reference to compensate the image sample to a known arbitrary "standard" level.

When the next line is captured the light level will have changed, but this does not matter because the down stream electronics will detect this in the reference 175 and again compensate the image sample to the known arbitrary standard level. The interface 185 has the function of making the signal format compatible with the input to the electronics 160.

The end result of implementing the invention is that the ripples in the final image (shown in FIG. 2) are eliminated from the image at the output of the machine. Any residue of the ripples will be reduced to the noise floor of the total system.

Figure 5:
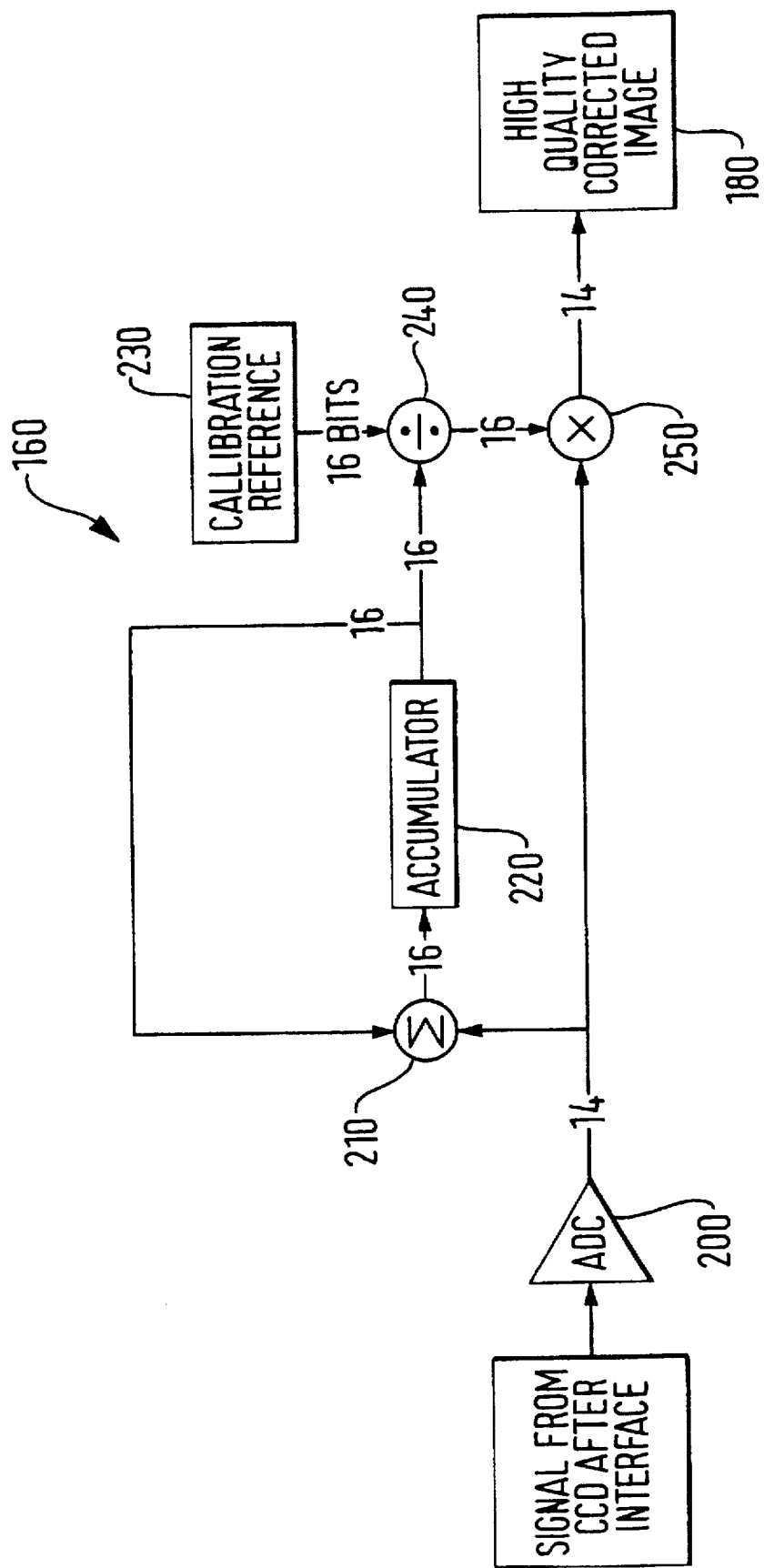
FIG. 5 is a diagram showing a possible operation of the correction process according the preferred embodiment.

In order to perform the correction, the signal processing electronics block 160 could perform the functions shown in FIG. 5.

The processing electronics shown in FIG. 5 comprises an ADC 200, summing means 210, an accumulator 220, a calibration reference 230, a divider 240 and a multiplier 250. The summing means 210 and accumulator 220 together comprise a multiplier-accumulator such as a Logic Devices LMA 2010 JC65. The divider 240 and multiplier 250 comprise a look-up table. For a film scanner the easiest method to perform the actual correction is to quantise all the information with a fast wide dynamic range Analogue to Digital Converter 200 and perform the mathematics with Digital Signal Processing building blocks. The optical sampling system which provides the image and reference samples 125,175 is organised such that the reference 175 for each line is presented to the signal processing electronics before the image samples 125 arrive. This is straight forward to achieve with line array CCD and allows for DSP processing time. The input to ADC 200 thus comprises a serial stream of image and reference samples, with the reference samples arriving at the ADC first.

The output from interface 185 comprising image and reference samples 125,175 is input to ADC 200 where the samples are quantised and the initial reference samples 175 are summed in summing means 210 and the result accumulated in accumulator 220, ready for generation of the correction coefficient. The reason that several samples of each reference sample 175 are required is that, if just one reference sample 175 were used, it would contain the same amount of random noise as the image signal, and when the correction coefficient is generated from this and applied to the signal it would raise the effective total noise content of wanted image on a line to line basis. By summing several samples of each reference sample the random noise is integrated. Each time the number of samples used is doubled the value doubles, but the r.m.s. noise contained within the signal only increased by a factor of 1.4. In this way the noise content of the correction coefficient can be reduced to an insignificant amount. The noise integration is an important part of the processing. The summing of the samples of each reference sample occurs during the time period between taking samples from the sensor 130.

For reliable operation with a high accuracy resolution film scanner 40–50 reference samples will be adequate to generate the correction coefficient with sufficient accuracy.

The output from the accumulator 220 is compared with an arbitrary fixed calibration reference 230 at divider 230. The output of the divider 230 is the correction coefficient which multiplies the image signal at multiplier 250 to produce the corrected output signal 180. The calibration reference and divider provide the devised coefficient at a chosen level for the multiplier 250.

Figure 6:
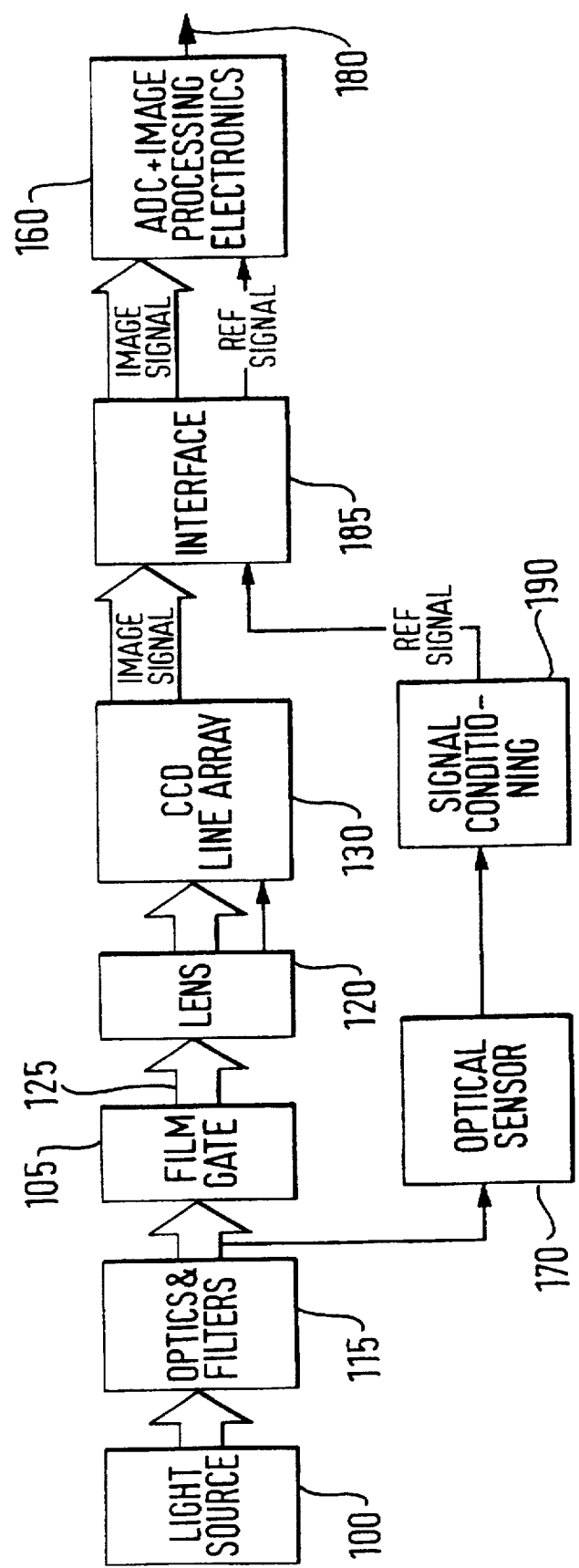
FIG. 6 is a diagram showing a third, alternative embodiment of the invention.

A third, alternative embodiment of the invention is shown in FIG. 6.

In this embodiment a sample of the light prior to the film gate is routed to a separate sensor 170, which then passes its information on to the image processing electronics 160 via the interface 185. Although this system ignores the influence of the lens and the film image CCD 130, it is practically as good as the optimal solution used in the second embodiment because the lens 120 and the CCD components of the system are the most stable assuming the proper precautions are taken with CCD.

This alternative embodiment leads to a simpler optical system in the film scanner with the benefit of being consequently less expensive. The optical sensor 170 is positioned adjacent to the film gate such that is can "see" the illumination as it impinges the film. The Signal Conditioning block 190 contains a "sample-and hold" circuit that captures and stores the output of the Optical Sensor block 170. The control of the sample-and hold is such that it emulates the exposure timing (instant and duration) of the CCD sensor. In this way all the information necessary to perform the correction is passed via the Interface 185 to the processing electronics 160.

Additional optics and filters 115 are shown in this embodiment, as in the second embodiment. These may comprise coloured and neutral density filters for providing three-colour scans and CCD level correction, as before.

This alternative embodiment may use the same processing circuitry 160 as described above (FIG. 5.) as the preferred embodiment, with some minor design differences.

So far, embodiments have been described with reference to a line array CCD film scanner. The invention may apply to other types of film scanner, such as an area array film scanner. In an area array film scanner, the image information for a complete field or frame is captured in one instant, in the same manner as a line array captures all the information for a single line in one instant. The image sample for the field or frame may be corrected with respect to the reference sample in the same manner as previously described. The invention used with an area array thus corrects for fluctuations in the light source intensity between field or frame samples.

An implementation of the second, preferred embodiment could have the film image CCD actually scan the sprocket holes of the film as they are exposed to the CCD through the film gate. The portion of light imaged onto the CCD through the sprocket hole could act as the reference sample. This assumes that the film gate is wide enough to expose the sprocket holes. A precaution would be taken to ensure that the exposure of the sprocket holes did not cause unacceptable flare into the film image. With scanning arrangements and slit optics such as proposed in UK Patent Application No: 9401907.2 this would not represent any difficulty.

By sensing the clear sprocket hole through the gate the sensed light would take into account any temperature variation in the optical path and of course within the film image sensing CCD itself. In this way, the optical paths of the reference and image samples 175,125 are as similar as possible.

However, with such an approach it must be remembered that the sprocket holes are only present over approximately 40% of the film frame height (this is as measured on academy exposed 35 mm). Using an area array CCD as the image sensor this presents no problem as there is adequate simultaneous sampling of the reference through the sprocket holes to allow correction to be performed. However, when using a line array CCD, this results in 60% of the scanning to be executed without light level correction being directly applied.

This draw back can be overcome by using this sprocket hole light sensing, in combination with the first or third embodiments, to act as the means of compensating the differential drift between the image and reference sensors for the invention implementation using the separate sensor 170 looking at the light source. This allows the difference between the image sensor 130 and the reference sensor 170 to be reduced, to negate the drawbacks of using the separate reference sensor 170 rather than a portion of the image sensor 130 to provide the reference sample. The advantage provided is that the image and reference sensors may be compared simultaneously many times in use, thus allowing continuous alignment of the image and reference sensors during operation. Using sprocket hole sensing allows the alignment to be frequent enough to eliminate the effects of low frequency differential drift between the image and reference sensors.

To avoid interactive hunting of the electro-optical systems a sample and hold function would be used with the film image CCD sensed sprocket hole signal. Because a sprocket hole covers about 10% (with 35 mm academy exposure) of the film frame height multiple line scan samples will be taken and hence the electrical noise immunity benefit as previously described will be obtained.

This is because the drift (i.e. low frequency noise) in the optical path and the interface will modulate the light sensed through the sprocket hole. By combining the sprocket hole sensing to align the reference sensor of the first or third embodiments the benefits of using the single sensor as in second embodiment can be obtained. In summary, this is a practical method of achieving a very close approximation to the optimum implementation.

The invention may be implemented in any of the three described forms viz:

Optimal, as in the second, preferred embodiment using a separate light gate bypass and recombination before imaging on the film sensor CCD to obtain an electronic correction of the image signal.

Alternative, as in the third embodiment using a separate light sensor and correction of the image signal.

Sprocket hole sensing on the film image CCD sensor to set a reference for the separate light sensor which produces the correction factor for the image signal which may be used with the first of third embodiments.

The proposed invention for eliminating optical noise with line array CCD film scanners offers a solid state sensor film scanner the same benefits as a Burn Corrector with a Flying Spot telecine.

It should be noted that real time CCD telecines have not needed to compensate for optical noise because their performance parameters were limited by critical components, such as the CCD sensor itself, and aspects of the system design. For instance the higher scanning rate would render some of the noise subjectively acceptable. These factors would tend to make the final effect insignificant compared to the quality of scan the machine was intended to deliver. However, if these telecines were upgraded to a level comparable with a high resolution film scanner, the optical noise would take on more significance. In this circumstance, the invention could be implemented equally well with both real time and non real time film scanners.

Whilst the embodiments have been described with respect to line to line and frame to frame fluctuations the invention is equally applicable to pixel to pixel fluctuation correction or light source drift correction. The type of error corrected will depend upon the frequency of the of the noise involved. High frequency errors are manifested as pixel or line fluctuations, whilst low frequency errors are manifested as frame flicker of light source drift. Any of these frequencies could be corrected in embodiments of the invention.

What we claim is:

1. A noise corrector for a film scanner, said film scanner comprising;

a light source for illuminating film; and a first detector for detecting a first sample of light from said light source modulated by said film to produce a first signal;

wherein said noise corrector comprises;

a second detector for detecting a second sample of light from said light source unmodulated by said film to detect the fluctuations in intensity to produce a second signal; and means for compensating said first signal with reference to said second signal to produce an output signal.

2. The noise corrector of claim 1, wherein said first detector and said second detector are separate portions of a single sensor.

3. The noise corrector of claim 1, wherein said first sample of light passes from said light source to said first detector through a first optical path, and said second sample of light passes from said light source to said second detector through a second optical path, and said first optical path and said second optical paths are substantially similar except that the first sample is modulated by the film whilst the second sample is not.

4. The noise corrector of claim 1, wherein the scanner comprises a film gate and said film is held in said gate, and wherein said first sample passes through said film held in said gate and said second sample passes around said gate.

5. The noise corrector of claim 1, wherein said film scanner comprises an imaging lens for imaging said first sample and said second sample onto said respective first and second detectors, and wherein said first sample and said second sample pass through the imaging lens.

6. The noise corrector of claim 1, wherein said means for compensating said first signal with reference to said second signal comprises an electronic circuit for comparing said first signal and said second signal, and said output signal is a video signal.

7. The noise corrector of claim 1, wherein said first detector is a line array CCD.

8. The noise corrector of claim 1, wherein said first detector and said second detector are separate portions of a single sensor and said single sensor is an area array CCD.

9. The noise corrector of claim 1, wherein the noise corrected is optical noise.

10. The noise corrector of claim 1, wherein said second sample of light unmodulated by said film is sampled through a sprocket hole of said film.

11. A noise corrector for a film scanner, the film scanner comprising;
   a light source for illuminating film; and
   a first detector for detecting a first sample of light from said light source modulated by said film to produce a first signal;
wherein said noise corrector comprises:
   a second detector for detecting a second sample of light from said light source unmodulated by said film to produce a second signal;
   a third detector for detecting a third sample of light from said light source unmodulated by said film to produce a third signal;
   means for compensating said first signal with reference to said second signal to produce an output signal comprising a compensated said first signal; and
   means for performing a comparison of said second signal and said third signal and for producing a comparison signal in accordance with said comparison;
wherein said means for compensating is adjusted in accordance with said comparison signal.

12. The noise corrector of claim 11, wherein said first detector and said third detector are separate portions of the same sensor, and said comparison made by the comparing means is to allow for differential drift between said first detector and said second detector.

13. The noise corrector of claim 11, wherein said third sample of light is sampled through a sprocket hole of said film.

14. A film scanner, comprising:
   a light source for illuminating film;
   a first detector for detecting a first sample of light from said light source modulated by the film to produce a first signal;
   a second detector for detecting a second sample of light from said light source unmodulated by the film to detect the fluctuations in intensity to produce a second signal; and
   means for compensating said first signal with reference to said second signal to produce an output signal.

15. A noise corrector for a film writer, said film writer comprising:
   a light source; and
   means for modulating said light source for illuminating film in accordance with an input signal,
said noise corrector comprising:
   a detector for detecting a reference sample of light undulated by said means for modulating; and
   means for compensating for noise by adjusting said means for modulating with reference to the reference sample.

16. The noise corrector of claim 15, wherein said means for modulating said light source comprises a modulator which is separate from said light source.

17. The noise corrector of claim 15, wherein said means for modulating comprises a Deformable Mirror Device (DMD) modulator.

18. The noise corrector of claim 15, wherein said means for modulating comprises a DMD modulation and further comprising a detector for detecting light from said DMD which is not written to the film, said means for compensating for noise including means for adjusting the input to the DMD with reference to the sample of light from the DMD which is not written to the film.

19. The noise corrector of claim 15, wherein said means for compensating for noise comprises an electronic circuit, and said input signal is a video signal.

20. A noise corrector for a film writer, said film writer comprising:
   a light source; and
   means for modulating said light source for illuminating film in accordance with an input signal;
   said noise corrector comprising:
      a detector for detecting a reference sample of light modulated by said means for modulating; and means for comparing said reference sample and said input signal to compensate for noise by adjusting said means for modulating with reference to the reference sample.

21. The noise corrector of claim 20, wherein said light source and said means for modulating the light source are a single unit.

22. The noise corrector of claim 20, wherein said light source and said means for modulating said light source is a Cathode Ray Tube (CRT).

23. The noise corrector of claim 20, wherein the noise corrected is optical noise.

24. A method of correcting for fluctuations in intensity of a light source in a film scanner, comprising:
   illuminating film with light from a single source;
   detecting light from said light source modulated by said film to produce a first signal;
   detecting light from said light source unmodulated by the film to detect fluctuations in intensity to produce a second signal; and
   compensating said first signal with respect to said second signal to produce an output signal.

25. A method of correcting for fluctuations in intensity of a light source in a film writer, comprising:
   modulating light from a light source for writing to film in accordance with an input signal;
   detecting an unmodulated reference sample of light from said light source; and
   compensating for fluctuations in intensity of said light source by adjusting said modulation of the light with reference to said reference sample.

26. The method of claim 25, wherein the film writer is a DMD film writer, the method comprising:
   sensing light from said DMD which is not written to the film; and
   adjusting the modulation of the light with reference to the sample of light from the DMD which is not written to the film.

27. The method of claim 26, wherein said DMD comprises a plurality of mirrors each having an on state wherein line is directed to said film and an off state wherein light is directed away from said film;
   said adjusting comprising varying the total duration of said on state of each mirror.

28. A method of correcting for fluctuations in intensity of a light source in a film writer, comprising:
   modulating light from a light source for writing to a film portion in accordance with an input signal, detecting a reference sample of light from said light source modulated in accordance with said input signal, and comparing the reference sample and the input signal to compensate the input signal.

29. A method of writing film comprising:

modulating light from a light source and writing a portion of film in accordance with an input signal;

detecting an unmodulated reference sample of light from said light source, deriving an error signal from said reference sample; and re-writing said portion of film with light modulated in accordance with said error signal.

30. A method of writing film comprising:

modulating light from a light source and writing a portion of film in accordance with an input signal;

detecting a modulated reference sample of light from said light source, to produce a reference signal;

deriving an error signal by comparing said reference signal and said input signal; and rewriting said portion of film with light modulated in accordance with said error signal.

31. The method of claim 28, wherein said writing of said portion of film comprises underexposing said portion of film so that said portion of film requires a remaining exposure, and said rewriting comprises exposing said portion of film with remaining exposure compensated in accordance with said reference sample.

* * * * *

UNITED STATES PATENT AND TRADEMARK OFFICE
CERTIFICATE OF CORRECTION

PATENT NO. : 5,784,529
DATED : July 21, 1998
INVENTOR(S) : Benjamin Franklin RICHMOND It is certified that error appears in the above-identified patent and that said Letters Patent is hereby corrected as shown below:

On the title page of the patent at Item [73], change the Assignee to:

--Cintel International Limited, United Kingdom--.

Signed and Sealed this

Twenty-ninth Day of June, 1999

Attest:

Q. TODD DICKINSON

Attesting Officer     Acting Commissioner of Patents and Trademarks